Oct. 22, 1957  E. R. CUNNINGHAM  2,810,536
CRADLE TYPE BASE FOR ROTATABLE MACHINERY
Filed Dec. 7, 1954
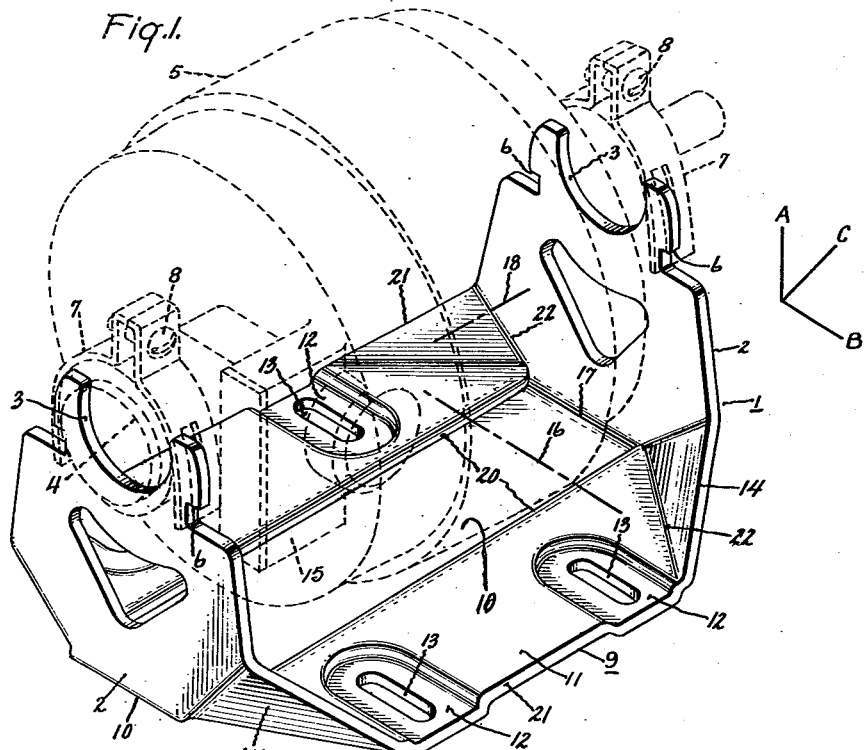
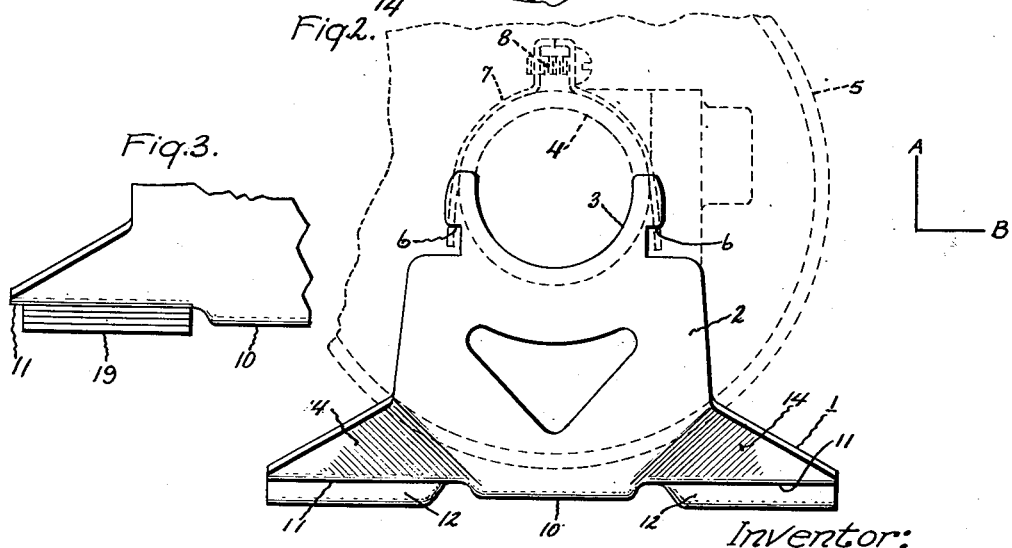
Inventor:
Eldon R. Cunningham,
by
His Attorney.

United States Patent Office 2,810,536
Patented Oct. 22, 1957

2,810,536
CRADLE TYPE BASE FOR ROTATABLE MACHINERY

Eldon R. Cunningham, Fort Wayne, Ind., assignor to General Electric Company, a corporation of New York Application December 7, 1954, Serial No. 473,703

4 Claims. (Cl. 248—19)

This invention relates to support means, and more particularly to a cradle type base for rotatable machinery.

It is frequently desirable that rotatable machinery be maintained entirely stationary, apart from the rotation, during operation. Particularly where the machinery is small, it has been the custom to use a cradle type base wherein a single piece of material is formed to support each end of the machine. A major difficulty which has been encountered during such use has been that while the cradle type base permits mounting of a motor in any desired position, it has not in the past provided the rigidity requisite in certain instances. It is therefore desirable to provide a cradle type base which will be economical to manufacture yet which will provide a high degree of radial and axial rigidity in order to support rotatable machinery without undesirable motion.

It is therefore, an object of this invention to provide an improved cradle type base for rotatable machinery which will incorporate the improvements set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspect, provides a unitary cradle type base for rotating machinery which is so formed that a force along any one of the three principal axes will encounter an increased moment of inertia. Since the load versus deflection characteristic of the base within the elastic limit of the material may be described by the formula $$d = \frac{KFL^n}{EI}$$

where $d$ represents the deflection, K is a constant of proportionality, F represents the force, L is the length, $n$ is an exponent which is constant for a given base, and I represents the moment of inertia of the section of the base in which force F induces the bending moments, it will be obvious that an increase in the moment of inertia will decrease the amount of deflection for a given force. The formulae for the moments of inertia of the cross sections of a base are well-known to those skilled in the art. For instance, the moment of inertia of an I-beam section is determined by the formula $$I = \frac{BD^3 - C^3(B-T)}{12}$$

in which B equals the dimension of the base parallel to the axis about which the bending moment causes deflection, D equals the maximum dimension of the base perpendicular to the axis of deflection, T is the thickness of the web, and C equal D minus twice the thickness of a flange. The improved base of this invention is so formed that whichever of the three axes the force is applied along the dimension D will be relatively high, thereby providing a considerable moment of inertia since the moment will increase with the cube of the dimension D. Each cross section is designed to get as much material as far from the neutral axis as practical. To get the maximum moment of inertia, the base has a pair of upstanding portions adapted respectively to support a pair of machine hub portions. A base portion joins the upstanding portions; part of the base portion is formed as a plane surface to provide a seat, while a susbtantial part is formed out of the plane of the first part.

In the drawing, Figure 1 is a view in perspective of the improved cradle type base of this invention;

Figure 2 is an end view of the improved cradle type base; and

Figure 3 is a fragmentary end view of a modification of the invention.

Referring now to Figures 1 and 2 of the drawing, there is shown an improved cradle type base generally indicated by the numeral 1. The base is provided with a pair of upstanding portions 2 at each end respectively, preferably in parallel relation, each of which terminates in an arcuate recess 3. This recess is adapted to receive the hub portion 4 of a rotatable machine, such as the electric motor indicated in dotted outline at 5. A pair of latch projections 6 are formed on each side of the arcuate recess 3, and the hub 4 which is seated in the recess is latched to the base member 1 by means of straps 7 which are screwed together as shown at 8 to act as clamps to maintain the hub and the portion 2 of the base member 1 in tight engagement. It will be understood that the features thus far set forth are included mainly for purposes of illustration and are well-known in the art.

The two upstanding portions 2 which support the rotatable machine indicated at 5 are joined by a portion 9, which includes a central plane strip portion 10 and two outside strip portions 11 on each side thereof respectively, in a plane parallel to the strip portion 10 and substantially coextensive therewith along their inner edges 20 respectively. The outer edges 21 of portions 11 respectively are shorter than inner edges 20, so that ends 22 of the strips are slanted as shown. It will be observed that center portion 10 is substantially lower than side portions 11, and that the center portion will, therefore, provide the support for the base while the side portions will be raised thereabove. Each of side portions 11 is, however, provided with a depressed portion 12 in which is formed a bolt opening 13 so that bolts (not shown) may be inserted in the openings to secure the base member 1 in position. The depressed portion 12 is provided, as is shown best in Figure 2, slightly lower than center portion 10 in order to provide a stable platform made up of a plurality of locations so that there will be no tendency of the base to rock.

Plane angle portions 14 are provided joining side portions 11 respectively to the end portions 2 respectively. The end portions 2 are formed to flare outwardly from their base at each side along a substantially straight line which forms the joint between angle portions 14 and end portions 2. It will be observed that these angle portions extend upwardly and outwardly at an angle such that no interference will occur with the rotatable machine 5 even through it be turned on its axis until extending terminal box 15 extends adjacent one of the angle portions 14.

It will be understood that all external forces applied to the base 1 may be broken down into vectors extending along three main axes which are indicated by the arrows A, B, and C respectively. A force along axis A will tend principally to cause bending of the base about a line perpendicular to axis A as indicated in the drawing by line 16. As stated before, the moment of inertia is a function of BD³. With reference to the axis indicated by the line 16, the B dimension would be the width of the base and the D dimension would be the depth of the base as measured from the bottom of section 10 to the top of portion 11. It will be seen that the D dimension is by far the most important since it is cubed in the formula, and that this has been considerably increased over what it would be in a flat face, or one which was merely ribbed for instance, by the formation of portions 11 at the level higher than that of portion 10. Thus, the relatively small increase over such an arrangement represented by the change in level from portion 10 to portion 11 will be cubed to represent the increase of the moment of inertia, thereby supplying a far greater moment of inertia than was obtainable in previous cradle type bases. As shown by the formula $$d = \frac{KFL^n}{EI}$$

explained previously, the increase in I will cause a far smaller deflection of the base about axis 16 for a given force than previously when the moment of inertia was not so great.

Referring now to axis C, when a force is exerted therealong by the rotating machine there will be a tendency to bend end portion 2 in the manner that a lever is bent. In other words this bending will occur principally about the line where portion 2 joins the base portion 9, that is, along line 17. It will be observed that in this case the provision of slanting portion 14 will have served to increase both the B and D dimensions thereby greatly to increase the moment of inertia about the axis 17. For this reason, bending of the base 1 due to forces along axis C will also be greatly diminished.

Insofar as forces along axis B are concerned their main tendency will be to cause a bending of the base 1 about an axis parallel to the line represented at 18. In this case, it will be observed that the provision of slanted portions 14 and of deepened center portion 10 combine to provide increased B and D dimensions again to increase the value of the moment of inertia and therefore the amount of bending to which the base will be subject for a given force along axis B.

While recesses 12 are, of course, desirable in order to provide locating points for the base it will be seen that the provision of such recesses decreases the resistance to bending of the portion 11 of base portion 9 because they decrease the effectiveness of the D dimension with respect to an axis parallel to line 16. This may be overcome by the embodiment set forth in Figure 3 where like parts are referred to by like numerals. In this embodiment, the recesses 12 of Figures 1 and 2 have been eliminated and portion 11 is completely flat with openings 13 (not shown) in Figure 3 being provided in the flat portion without a surrounding recess. In order to position the base properly in this instance it is desirable to furnish, in addition, spacer members such as 19 which will take the place of recesses 12 in positioning the base 1. Such a construction avoids the decrease in resistance to bending, occasioned by the presence of the recesses 12, by the provision of additional spacers 19.

It will be seen that the improved cradle type base set forth above provides greatly increased resistance to bending in all diretcions due to the particular formation of its component portions. It will, however, be understood that the modifications in the various B and D dimensions set forth above may be achieved by variations other than those shown and, therefore, while the invention has been explained by describing particular embodiments thereof, it will be apparent that improvements and modifications may be made without departing from the scope of the invention as defined in the appended claims.

What I claim as new and desire to secure by Letters Patent of the United States is:

1. A unitary base member having a pair of substantially parallel upstanding portions adapted respectively to receive the hub portions of a rotatable machine, each of said upstanding portions flaring outwardly at each side thereof from the base thereof along a substantially straight line and a base portion joining said upstanding portions, said base portion having a central strip portion thereof extending between said upstanding portions and formed as a plane surface, said base portion having a pair of strip portions respectively located on each side of said central strip portion and formed in a plane surface parallel to said first plane surface, each of said pair of strips having an inner edge substantially coextensive with the adjacent edge of said first strip portion and having an outer edge shorter than said inner edge terminating at each end short of an upstanding portion, and plane portions slanted to said strip portions and to said upstanding portions respectively connecting the ends of said pair of strip portions to said upstanding portions along the outwardly flared straight edges thereof.

2. A unitary base member having a pair of substantially parallel upstanding portions adapted respectively to receive the hub portions of a rotatable machine, each of said upstanding portions flaring outwardly at each side thereof from the base thereof along a substantially straight line and a base portion joining said upstanding portions, said base portion having a central strip portion extending between said upstanding portions and formed as a plane surface, said base portion having a pair of strip portions respectively located on each side of said central strip portion and formed in a plane surface parallel to said first plane surface, each of said pair of strip portions having an inner edge substantially coextensive with the adjacent edge of said central strip portion and having an outer edge shorter than said inner edge terminating at each end short of an upstanding portion, and plane portions slanted to said strip portions and to said upstanding portions respectively connecting the ends of said pair of strip portions to said upstanding portions along the outwardly flared straight edges thereof, each of said pair of strip portions having a pair of spaced openings formed therein adjacent the outer edge thereof respectively adapted to receive clamping means.

3. A unitary base member having a pair of substantially parallel upstanding portions adapted respectively to receive the hub portions of a rotatable machine, each of said upstanding portions flaring outwardly at each side thereof from the base along a substantially straight line and a base portion joining said upstanding portions, said base portion having a central strip portion extending between said upstanding portions and formed as a plane surface, said base portion having a pair of strip portions respectively located on each side of said central strip portion and formed in a plane surface parallel to said first plane surface, each of said pair of strip portions having an inner edge substantially coextensive with the adjacent edge of said central strip portion and having an outer edge shorter than said inner edge terminating at each end short of an upstanding portion, and plane portions slanted to said strip portions and to said upstanding portions respectively connecting the ends of said pair of strip portions to said upstanding portions along the outwardly flared straight edges thereof, each of said pair of strip portions having a pair of recessed portions formed therein adjacent the outer edge thereof in the plane of said central strip portion, each of recessed portions having an opening formed therein and adapted to receive clamping means.

4. A unitary base member having a pair of substantially parallel upstanding portions adapted respectively to receive the hub portions of a rotatable machine, each of said upstanding portions flaring outwardly at each side thereof from the base thereof along a substantially straight line and a base portion joining said upstanding portions, said base portion having a central strip portion thereof extending between said upstanding portions, said base portion further having a pair of strip portions respectively located on each side of said central strip portion, said three strip portions being formed to provide at least two substantially parallel plane surfaces extending between said upstanding portions, each of said pair of strip portions having an inner edge substantially co-extensive with the adjacent edge of said first strip portion and having an outer edge shorter than said inner edge terminating at each end short of an upstanding portion, and plane portions slanted to said strip portions and to said upstanding portions respectively connecting the ends of said pair of strip portions to said upstanding portions along the outwardly flared straight edges thereof.

References Cited in the file of this patent

UNITED STATES PATENTS

| | | |
|---|---|---|
| 1,806,329 | Bump | May 19, 1931 |
| 2,209,477 | Reibel | July 30, 1940 |
| 2,296,221 | Pontis | Sept. 15, 1942 |